US009188423B2

(12) United States Patent
Gatesoupe et al.

(10) Patent No.: US 9,188,423 B2
(45) Date of Patent: Nov. 17, 2015

(54) METHOD AND A SYSTEM FOR DETERMINING THE ANGULAR POSITION OF A ROTARY ELEMENT USING MULTIPLE GROUPS OF SENSORS, AND A BEARING INCLUDING SUCH A SYSTEM

(75) Inventors: Alexis Gatesoupe, Monnaie (FR); Stephane Moisy, L'Île-Bouchard (FR)

(73) Assignee: AKTIEBOLAGET SKF, Gothenburg (SE)

( * ) Notice: Subject to any disclaimer, the term of this patent is extended or adjusted under 35 U.S.C. 154(b) by 262 days.

(21) Appl. No.: 13/818,409

(22) PCT Filed: Aug. 24, 2010

(86) PCT No.: PCT/IB2010/002449
§ 371 (c)(1),
(2), (4) Date: May 10, 2013

(87) PCT Pub. No.: WO2012/025778
PCT Pub. Date: Mar. 1, 2012

(65) Prior Publication Data
US 2013/0221955 A1 Aug. 29, 2013

(51) Int. Cl.
*G01B 7/30* (2006.01)
*G01D 5/14* (2006.01)
*G01D 5/12* (2006.01)
*G01D 5/244* (2006.01)

(52) U.S. Cl.
CPC .. *G01B 7/30* (2013.01); *G01D 5/12* (2013.01); *G01D 5/145* (2013.01); *G01D 5/24461* (2013.01)

(58) Field of Classification Search
CPC ....... G01B 7/30; G01D 5/12; G01D 5/24461; G01D 5/145

USPC .......................................... 324/207.25, 207.2
See application file for complete search history.

(56) References Cited

U.S. PATENT DOCUMENTS

| 5,284,059 A * | 2/1994 | Wan ............................ 73/504.15 |
| 6,693,423 B2 | 2/2004 | Weser |
| 2001/0056333 A1 | 12/2001 | Dietmayer |
| 2006/0055259 A1 | 3/2006 | Hanlon |
| 2009/0267594 A1 | 10/2009 | Kather |

FOREIGN PATENT DOCUMENTS

| FR | 2861458 A1 | 4/2005 |
| WO | WO2007077389 A2 | 7/2007 |

* cited by examiner

*Primary Examiner* — Jay Patidar
(74) *Attorney, Agent, or Firm* — Bryan Peckjian; SKF USA Inc. Patent Dept.

(57) ABSTRACT

This method determines an angular position of a rotary element in a system where a magnetic ring rotatably fastened to the rotary element in communication with multiple sensors each suitable for issuing a unitary electric signal representative of a magnetic field generated by the magnetic ring. At least two groups of sensors adapted to generate, based on the unitary sensor signals, at least one combined electric signal representative of the angular position of the magnetic ring. This method comprises; a) verifying the consistency the combined electric signal with at least one given rule b) assessing whether or not each group of sensors is correctly working based on the verification of step a); and if, a first group of sensors is not correctly working, disregarding its combined electric signal and relying on the combined electric signal of at least a second group of sensors for determining an angular position value.

15 Claims, 3 Drawing Sheets

METHOD AND A SYSTEM FOR DETERMINING THE ANGULAR POSITION OF A ROTARY ELEMENT USING MULTIPLE GROUPS OF SENSORS, AND A BEARING INCLUDING SUCH A SYSTEM

CROSS-REFERENCE

This application is the US national stage of International Application No. PCT/IB2010/002449 filed on Aug. 24, 2010, the contents of which are herein fully incorporated by reference.

TECHNICAL FIELD OF THE INVENTION

This invention relates to a method for determining the angular position of a rotary element, such as a ring of a ball bearing, or the equivalent. The invention also relates to a system which is suitable for implementing this method and to a bearing incorporating such a system.

BACKGROUND OF THE INVENTION

WO-A-2007/077389 discloses Hall effect sensors regularly distributed around a magnetic ring to supply sinusoidal type electric signals that enable the angular position of a rotary element to be determined by computation. If one of the sensors is faulty, then the complete system becomes non-operational.

US-A-2006/0055259 discloses a fault-tolerant magnetic bearing where several sensor sets are used to sense rotor displacements in transverse directions. If a displacement sensor does not work correctly, its output signal is disregarded and compensated, which decreases the accuracy of the measure.

SUMMARY OF THE INVENTION

The invention takes an alternative approach and concentrates on the determination of an angular position, with a method whose accuracy is not substantially decreased in case one sensor is defective.

To this end, the invention relates to a method for determining an angular position of a rotary element rotating with respect to a stationary element in a system where a magnetic ring fast in rotation with the rotary element is arranged with respect to several sensors each suitable for issuing a unitary electric signal representative of a magnetic field generated by the magnetic ring. The sensors are arranged in at least two groups, each group of sensors being adapted to generate, on the basis of the unitary signals of its sensors, at least one combined electric signal representative of the angular position of the magnetic ring. The method comprises at least the following steps consisting in:
  a) verifying, for each group of sensors, the consistency of its combined electric signal with at least one given rule;
  b) assessing whether or not each group of sensors is correctly working on the basis of the verification of step a); and
  c) if, in step b), a first group of sensors is considered not to be correctly working, disregarding its combined electric signal and relying on the combined electric signal of at least a second group of sensors for determining an angular position value of the rotary element.

Thanks to the invention, if one or several sensors of a group of sensors are defective, for whatever reason, then this group of sensors can be neutralized, insofar as the corresponding combined electric signal is not taken into consideration for determining the angular position of the rotary element. This is possible since at least another group of sensors is provided which also produces a combined electric signal which can be used to compute the angular position of the rotary element.

According to aspects of the invention that are advantageous but not compulsory, such a method may incorporate one or more of the following features:
  The combined electric signal of each group of sensors includes a first signal part representative of a value of a sine of an angle corresponding to the angular position of the magnetic ring and a second signal part corresponding to a value of a cosine of this angle.
  In step a), the consistency of the combined electric signal is verified by checking if the sine and cosine values satisfy the rule $\sin^2+\cos^2=1\pm\Delta e$ where $\Delta e$ is a preset acceptable error value.
  Alternatively, in step a), the sine and cosine values are compared to reference values. In particular, each cosine value can be compared to the two possible cosine values corresponding to the sine value of the same combined electric signal.
  If, in step b), all groups of sensors are considered to be correctly working, determination of the angular position value of the rotary element in step c) is performed on the basis of any group of sensors.
  If, in step b), no group of sensors is considered to be correctly working, the angular position value of the rotary element is not computed.

The invention also provides a system for determining the angular position of a rotary element with respect to a stationary element, in particular by implementing a method as mentioned here-above. This system comprises a magnetic ring fast in rotation with the rotary element and several sensors, each suitable to issue a unitary electric signal representative of a magnetic field generated by the magnetic ring. The sensors are arranged in at least two groups, each group of sensors being adapted to generate, on the basis of the unitary signals of its sensors, at least one combined electric signal representative of the angular position of the magnetic ring. The system further includes:
  comparator means to verify, for each group of sensors, the consistency of its combined electric signal with at least one given rule;
  computation means to determine an angular position value of the rotary element on the basis of the combined electric signal of a group of sensors; and
  filtering means to provide the computation means with the combined electric signal of at least one group of sensors whose combined electric signal is found by the comparator means to be consistent with the rule and not to provide the computation means with the combined electric signal of any group of sensors whose combined electric signal is found by the comparator means not to be consistent with the rule.

According to aspects of the invention that are advantageous but not compulsory, such a system may incorporate one or several of the following features:
  All groups of sensors have the same number of sensors.
  The sensors are regularly distributed around a rotation axis of the magnetic ring and each sensor of a first group of sensors is located, angularly, between two sensors of a second group of sensors.
  The sensors of at least one group of sensors are grouped in an angular sector centered on a rotation axis of the magnetic ring.

The sensors of all groups of sensors are each grouped in respective angular sectors which are different.

The system includes at least one A/D converter and the computation means are digital.

The system includes at least one logical unit to convert the respective unitary electric signals of all sensors of a group of sensors into the combined electric signal(s) of this group of sensors. The system advantageously includes one logical unit per group of sensors.

Finally, the invention provides a bearing comprising a stationary ring and a rotary ring, together with a system as mentioned here-above.

BRIEF DESCRIPTION OF THE DRAWINGS

The invention can be better understood and other advantages thereof appear more clearly in the light of the following description of several embodiments of a method and a system in accordance with its principle, given solely by way of example and made with reference to the annexed drawings, in which.

DETAILED DESCRIPTION OF SOME EMBODIMENTS

Figure 1:
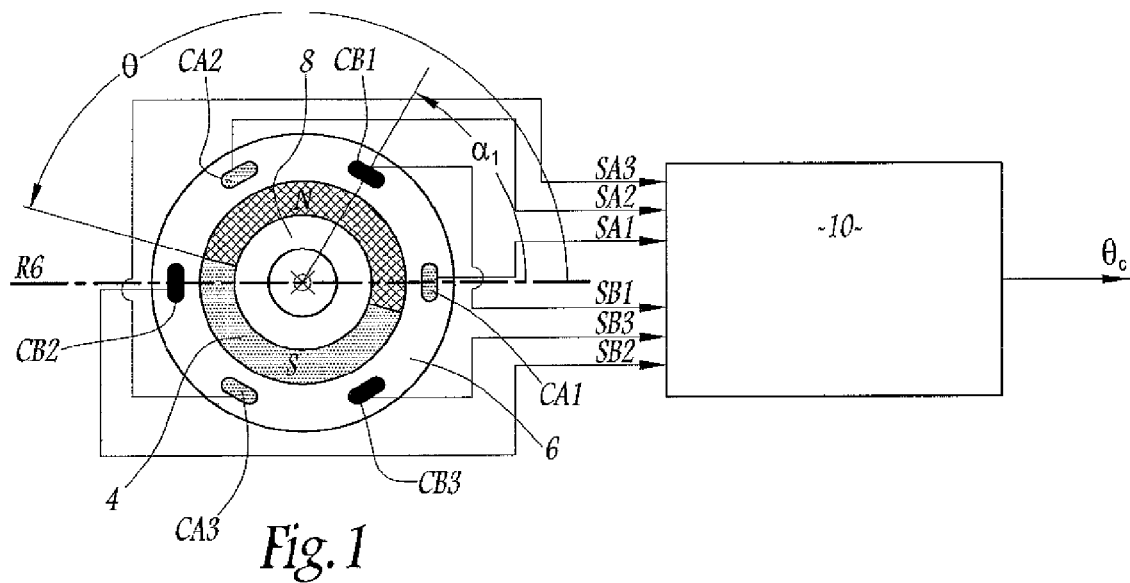
FIG. 1 is a diagram showing the principle of a system in accordance with the invention for implementing a method in accordance with the invention.
Figure 2:
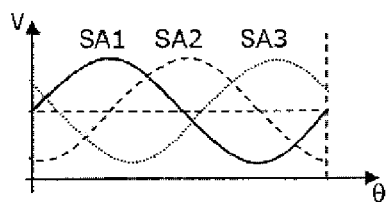
FIG. 2 represents the unitary electric signals respectively delivered by three sensors of a first group of sensors of the system of FIG. 1, as a function of an angular position of a rotary element.
Figure 3:
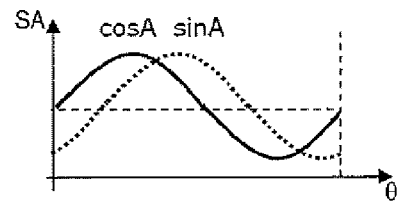
FIG. 3 is a representation of a sine value and cosine value derived from the signals of FIG. 2.
Figure 4:
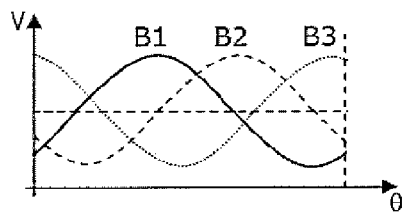
FIG. 4 is a view similar to FIG. 2 for second group of sensors.
Figure 5:
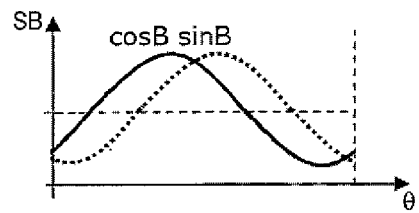
FIG. 5 is a view similar to FIG. 3 for the second group of sensors.

The system 2 shown in FIG. 1 comprises a magnetic ring 4 having two poles, namely a North pole N and a South pole S. The ring 4 rotates about an axis X4 perpendicular to the plane of FIG. 1.

A first set of three Hall effect cells CA1, CA2, CA3 is regularly distributed around axis X4 and around ring 4. These cells are mounted on a stationary part 6. Part 6 is stationary insofar as it does not rotate around axis X4. For example, stationary part 6 is fast with the outer stationary ring of a bearing, whereas magnetic ring 4 is fast in rotation with an inner rotating ring 8 of the bearing. System 2 allows to determine the angular position of items 4 and 8 with respect to axis X4. This angular position is represented by an angle θ between a fixed radius R6 and a radius R4 fast in rotation with magnetic ring 4.

Each of cells CA1 to CA3 delivers an analog electric signal SA1, SA2, SA3 in the form of a voltage that varies as a function of time and of the value of angle θ. Signals SA1, SA2 and SA3 are delivered to an electronic control unit or ECU 10 which also belongs to system 2.

Cells CA1, CA2 and CA3 together form a first group of sensors A and their respective unitary signals are combined by ECU 10 to generate a combined signal SA which comprises a sine component sin A and a cosine component cos A. Sine and cosine components are variable as a function of time and of angle θ. This computation is made in a sub-unit 102A of unit 10 which comprises a filter 104A and an amplifier 106A. Sub-unit 102A delivers signal components sin A and cos A of combined signal SA to an evaluator 108A.

A second group of sensors B is formed by three Hall effect cells CB1, CB2 and CB3 which are also regularly distributed around axis X4 and fast with part 6. Each of cells CB1, CB2 and CB3 delivers a unitary analog electric signal SB1, SB2 and SB3 in the form of a voltage that varies as a function of time and of the angular position of ring 4.

As for the first group A of sensors, signals SB1, SB2 and SB3 are provided to a sub-unit 102B including a filter 104B and an amplifier 106B and which is adapted to generate a combined signal SB including a sine component sin B and a cosine component cos B. These components which vary as a function of time and of angle θ, as signal SB, are provided to an evaluator 108B.

Unit 10 also includes a DC power supply 110 which feeds items CA1-CA3, CB1-CB3, 102A, 102B, 108A and 108B.

The above-mentioned construction of system 2 is such that combined electric signals SA and SB are redundant insofar as each of them is normally sufficient to determine the value of angle θ which represents the angular position of ring 4 with respect to a sensor group, that is a position of ring 8 with respect to stationary part 6.

Evaluator 108A is adapted to verify if combined electric signal SA is a priori usable to compute the value of angle θ. To this end, evaluator 108A computes the sum ΣA defined by equation 1:

$$\Sigma A = \sin^2 A + \cos^2 A \qquad \text{(Equation 1)}$$

Evaluator 108A verifies if sum ΣA equals 1 with an acceptable error value.

In other words, evaluator 108A verifies if equation 2 is satisfied:

$$\sin^2 A + \cos^2 A = 1 + \Delta e \qquad \text{(Equation 2)}$$

where

Δe is an acceptable preset error value.

Then, evaluator 108A forwards signal components sin A and cos A to a comparator 112. A flag signal FA is also forwarded by evaluator 108A to comparator 112 with a value equal to 1 if equation 2 is satisfied and to 0 if such is not the case.

Similarly, evaluator 108B checks if the following equation is satisfied $$\Sigma B = \sin^2 B + \cos^2 B = 1 \pm \Delta e \qquad \text{(Equation 3)}$$

Evaluator 108B also forwards to comparator 112 the values of sin B and cos B and a flag signal FB having the value 1 if equation 3 is satisfied and 0 if such is not the case.

Thus, comparator 112 is informed via flag signals FA and FB whether the combined signals SA and SB received from sensor groups A and B are a priori usable or not, to compute the value of angle θ. If one flag signal equals zero, for instance flag signal FA, then the corresponding combined electrical signal SA is considered not to be usable for this purpose.

Thus, evaluators 108A and 108B enable ECU 10 to check that signals SA and SB are consistent with the rules of equations 2 and 3 and to inform accordingly comparator 112.

For each combined electric signal SA and SB, comparator 112 is capable of checking the consistency of its respective sine and cosine components. For each value of sine A, only two values of cosine A are possible. A memory 114 stores a table with the two possible cosine values associated with each sine value, the number of values being dependent on the requested accuracy of the measure. For instance, 360 sine values are stored in memory 114 and 720 cosine values are stored, two cosine values for each sine value.

For each combined electric signal SA and SB received from evaluators 108A and 108B, comparator 112 can thus determine if the cosine component corresponds to one of the two predetermined values stored in memory 114. If the check by comparator 112 shows that one of signals SA or SB, whose flag FA or FB was received with value 1, is not consistent with the table of memory 114, then its flag value is changed to 0.

The respective signals SA and/or SB are then provided to a filter 116, together with flag signals FA and FB.

If flag signals FA and FB both equal 1, filter 116 can select either one of combined signals SA and SB to forward it to an analog-to-digital converter 118 which feeds a microprocessor 120 where the value $\theta_c$ of angle $\theta$ is computed.

Figure 6:
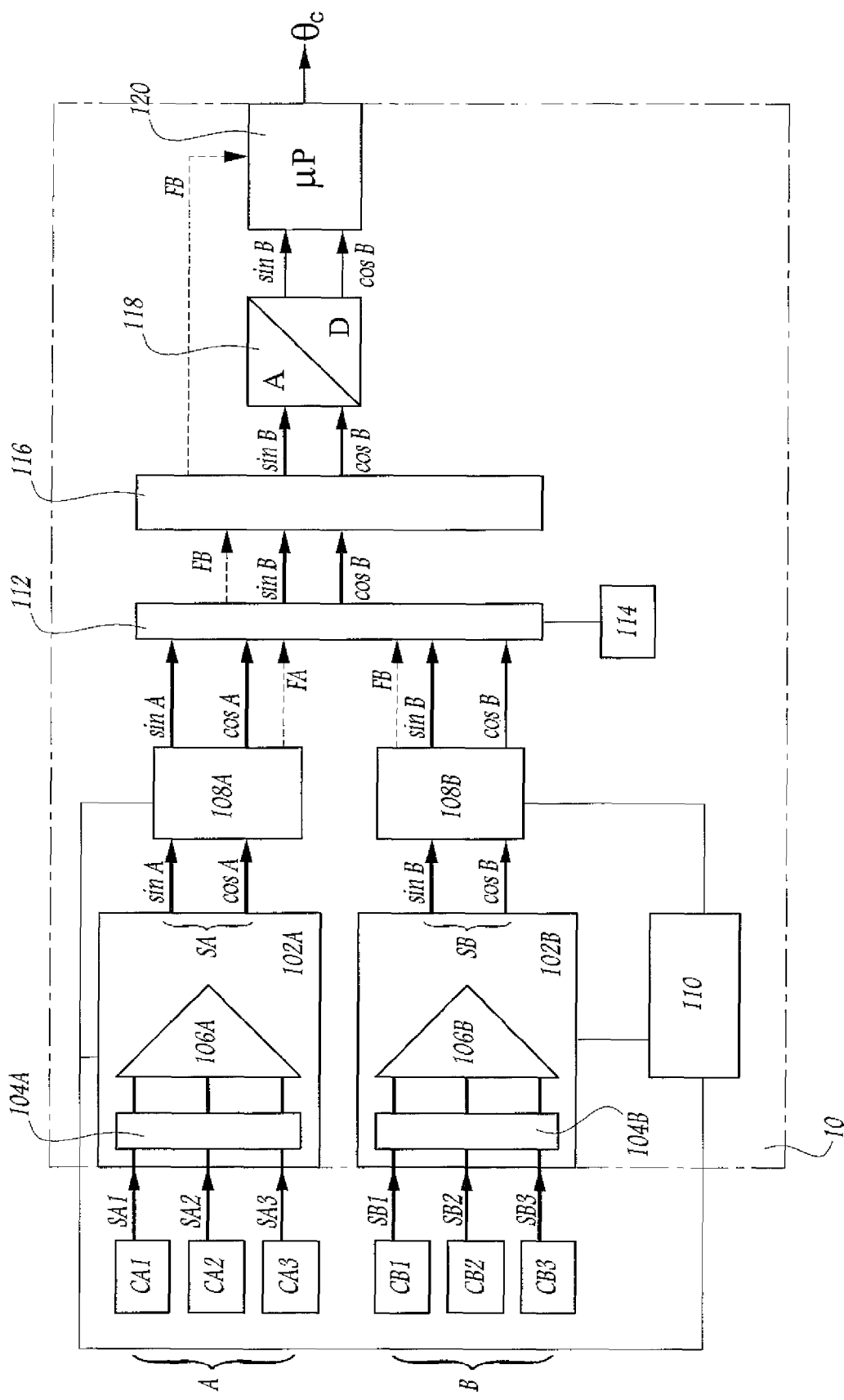
FIG. 6 is a representation of an electronic control unit used in the system of FIG. 1 and the associated cells.

On the other hand, if, for example, flag signal FA equals zero, then filter 116 feeds A/D converter 118 only with sine and cosine components of signal SB, so that, computation in microprocessor 120 takes place only on the basis of combined electric signal SB. This is represented on FIG. 6. This is fully satisfactory insofar as combined signal SB includes all information for an accurate computation of the value $\theta_c$ of angle $\theta$ by microprocessor 120. In other words, the fact that an error has been detected in combined signal SA does not decrease the accuracy of the computation in microprocessor 120.

Flag signal FB is also provided to microprocessor 120, so that microprocessor 120 can check that the digital signals sin B, cos B received from A/D convertor 118 are actually considered to be usable to compute the value $\theta_c$.

On the other hand, if combined signal B is found to be defective, to the point that flag signal FB equals zero, then filter 116 provides only signal SA to A/D converter 118.

If both combined signals SA and SB are found to be defective, then filter 116 does not provide A/D converter with any signal and the method is stopped. The angular value $\theta_c$ is not computed.

The actual position of the respective cells of each group of sensors A or B is defined with the following formula:

$$\varphi_i = (l-1) * \frac{2\Pi}{P*N} + k_i * \frac{2\Pi}{P} + C1 \qquad \text{(Equation 4)}$$

where

N is the number of cells of one group of sensors
i is an integer between 1 and N
$k_i$ is a positive or negative integer
P is a number of poles of the magnetic rings and
C1 is a real value.

In the preferred embodiment of the invention according to FIG. 1, for the cells forming the sensors of group A, C1 equals 0, N equals 3, so that the angle $\phi_1$ for CA1 (i=1) equals 0, the angle $\phi_2$ for CA2 (1=2) equals $\pi/3$ and the angle $\phi_3$ for CA3 (i=3) equals $2\pi/3$.

For the cells of the second group of sensors B, the respective values of the angle with respect to radius R6 are given buy the following equation:

$$\alpha_j = (j-1) * \frac{2\Pi}{P*N} + k_j \frac{2\Pi}{P} + C2 \qquad \text{(Equation 5)}$$

for j between 1 and 3.

In the present case, C2 equals $\pi/3$ so that the respective angles $\alpha_1$, $\alpha_2$ and $\alpha_3$ equal $\pi/3$, $\pi$ and $5\pi/3$. Only $\alpha_1$ is represented on FIG. 1.

Some other repartitions of the sensors of cells of each group of sensors A and B can be considered.

Figure 7:
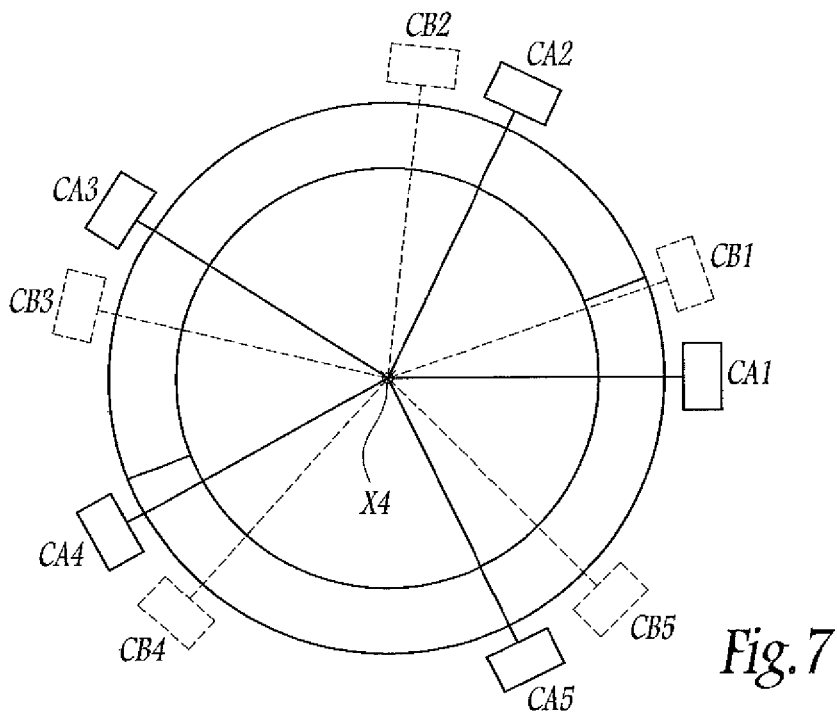
FIG. 7 is a schematic view corresponding to the left part of FIG. 1 for a system corresponding to a second embodiment of the invention and FIG. 8 is a view similar to FIG. 7 for a system corresponding to a third embodiment of the invention.

For example, as shown on FIG. 7, five sensors CA1, CA2, CA3, CA4 and CA5 belong to the first group of sensors A whereas five other sensors CB1, CB2, CB3, CB4 and CB5 belong to the second group of sensors B. In this embodiment, the sensors of each group of sensors are regularly distributed around the rotation axis X4 of the magnetic ring. As in the first embodiment, every sensor of a set of sensors lies angularly between two sensors of the other set of sensors.

Figure 8:
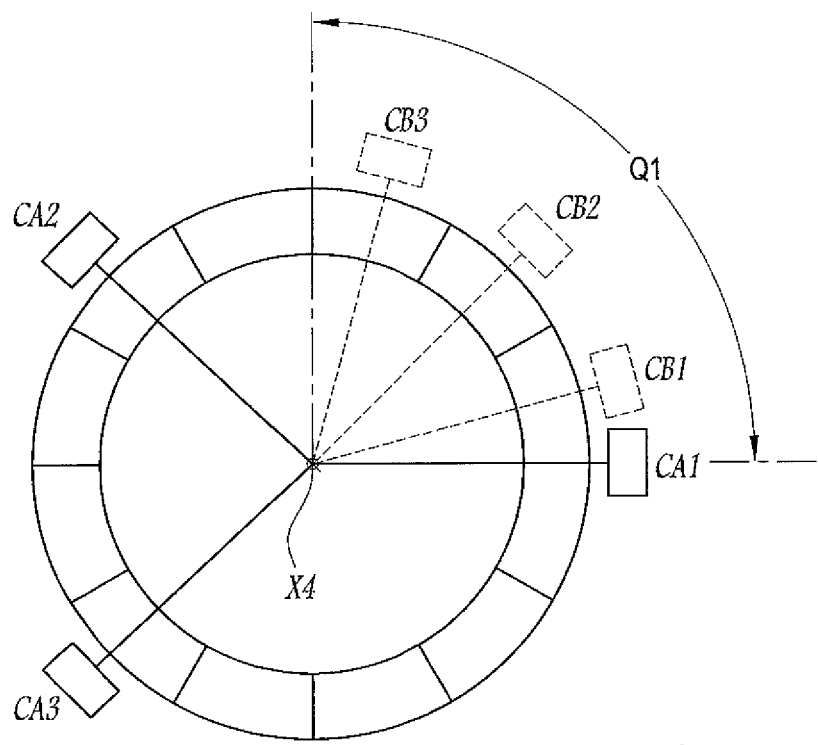

In the embodiment of FIG. 8, the cells CA1, CA2 and CA3 of the first group of sensors A are distributed as in the first embodiment but the cells CB1, CB2 and CB3 of the second group of sensors B are all located in a first quadrant Q1 with respect to the rotation axis X4 of the magnetic ring.

Other approaches can be considered. For instance, the respective cells CA1, CA2 and CA3 of the first group of sensors A can also be grouped in one angular sector around axis X4, preferably in a quadrant which is different from the one where the cells of the second group of sensors B are grouped.

The invention can be implemented with any repartition of the cells or sensors of the group of sensors.

The invention has been described here-above in case two groups of sensors are used. However, it is possible to consider using more than two groups of sensors. Then ECU 10 is adapted with the relevant number of sub-units and evaluators.

Alternatively, the functions of items 102A, 102B, on the one hand, 108A and 108B, on the other hand, can be performed by single apparatuses handling the signals of groups A and B one after the other.

The invention is described here-above in case two consistency verifications are implemented for each combined signal SA and SB with respect to two rules, namely a first verification in evaluators 108A and 108B with the rules of equations 2 and 3, and a second verification in comparator 112 with the values of the table in memory 114. Alternatively, only one of these verifications is implemented.

The number of cells or sensors in each group of sensors is preferably set to three or five. However, it can be different.

The A/D convertor 118 of ECU 10 can be installed in different places in this unit, e.g. between items 108A, 108B and 112, or between items 112 and 116, or even within sub-units 102A and 102B.

The respective features of the embodiments and variants mentioned here-above can be combined.

The invention claimed is:

1. A method for determining an angular position ($\theta$) of a rotary element rotating with respect to a stationary element in a system where a magnetic ring rotatably fastened to the rotary element is arranged with respect to multiple sensors (CA1-CA3, CB1-CB3; CA1-CA5, CB1-CB5) each suitable for issuing a unitary electric signal representative of a magnetic field generated by the magnetic ring, the sensors arranged in at least two groups (A, B), each group of sensors being configured to generate, on the basis of the unitary signals of its sensors, at least one combined electric signal (SA, SB) representative of the angular position of the magnetic ring, the method comprising the steps of:
   a) verifying, for each group of sensors (A, B), the consistency of its combined electric signal with respect to at least one rule;

b) assessing whether or not each group of sensors (A, B) is correctly working on the basis of the verification of step a); and
c) if a first group of sensors (A) is considered not to be correctly working (FA=0), disregarding its combined electric signal (SA) and relying on the combined electric signal (SB) of at least a second group of sensors (B) for determining an angular position value ($\theta_c$) for the rotary element.

2. The method according to claim 1, wherein the combined electric signal (SA, SB) of each group of sensors (A, B) includes a first signal part (sin A, sin B) corresponding to a value of a sine of an angle ($\theta$) representative of the angular position of the magnetic ring and a second signal part (cos A, cos B) corresponding to a value of a cosine of this angle and wherein, in step a), the consistency of the combined electric signal (SA, SB) is verified by checking the sine and cosine values to satisfy the rule:

$$\sin^2 A + \cos^2 A = 1 \pm \Delta e$$

where $\Delta e$ is a preset acceptable error value.

3. The method according to claim 1, wherein the combined electric signal (SA, SB) of each group of sensors (A, B) includes a first signal part (sin A, sin B) corresponding to a sine of an angle ($\theta$) representative of the angular position of the magnetic ring (4) and a second signal part (cos A, cos B) corresponding to a value of a cosine of this angle and wherein, in step a), the sine and cosine values are compared to reference values (114).

4. The method according to claim 3, wherein, in step a), each cosine value (cos A, cos B) is compared to the two possible cosine values corresponding to the sine value (sin A, sin B) of the same combined electric signal (SA, SB).

5. The method according to claim 1, wherein if, in step b), all groups of sensors (A, B) are considered to be correctly working, determination of the angular position ($\theta$) of the rotary element in step c) is performed on the basis of any group of sensors.

6. The method according to claim 1, wherein if in step b), no group of sensors (A, B) is considered to be correctly working, the angular position value ($\theta_c$) of the rotary element is not computed.

7. A system for determining an angular position ($\theta$) of a rotary element with respect to a stationary element, the system comprising a magnetic ring rotatably fastened to the rotary element and several sensors (CA1-CA3, CB1-CB3; CA1-CA5, CB1-CB5), each suitable to issue a unitary electric signal (SA1-SA3, SB1-SB3) representative of a magnetic field generated by the magnetic ring, wherein the sensors are arranged in at least two groups (A, B), each group of sensors being configured to generate, on the basis of the unitary signals of its sensors, at least one combined electric signal (SA, SB) representative of the angular position of the magnetic ring and wherein the system includes:
comparator means to verify, for each group of sensors (A, B), the consistency of its combined electric signal with respect to at least one rule;
computation means to determine an angular position value ($\theta_c$) of the rotary element on the basis of the combined electric signal (SA, SB) of a group of sensors (A, B); and
filtering means to provide the computation means with the combined electric signal (SB) of at least one group (B) of sensors whose combined electric signal is found by the comparator means to be consistent with the rule and not to provide the computation means with the combined electric signal (SA) of any group of sensors (A) whose combined electric signal is found by the comparator means not to be consistent with the rule.

8. The system according to claim 7, wherein all groups of sensors (SA, SB) have the same number of sensors.

9. The system according to claim 7, wherein the sensors (CA1-CA3, CB1-CB3; CA1-CA5, CB1-CB5) are regularly distributed around a rotation axis (X4) of the magnetic ring and each sensor (CA1-CA3; CA1-CA5) of a first group of sensors (A) is located, angularly, between two sensors (CB1-CB3; CB1-CB5) of a second group of sensors (B).

10. The system according to claim 7, wherein the sensors (CB1-CB3) of at least one group of sensors (B) are grouped in an angular sector (Q1) centered on a rotation axis (X4) of the magnetic ring.

11. The system according to claim 10, wherein the sensors of all groups of sensors are each grouped in respective angular sectors which are different.

12. The system according to claim 7, further comprising at least one A/D converter (118) and said computation means (120) are digital.

13. The system according to claim 7, further comprising at least one logical unit to convert the respective unitary electric signals (SA1-SA3, SB1-SB3) of all sensors (CA1-CA3, CB1-CB3; CA1-CA5, CB1-CB5) of a group of sensors (A, B) into the combined electric signal(s) (SA, SB) of this group of sensors.

14. The system according to claim 13, further comprising one logical unit per group of sensors (A, B).

15. A bearing comprising:
a stationary ring,
a rotary ring, and
a system for determining an angular position ($\theta$) of the rotary ring with respect to the stationary ring, the system comprising a magnetic ring rotatably fastened to the rotary ring and several sensors (CA1-CA3, CB1-CB3, CA1-CA5, CB1-CB5), each suitable to issue a unitary electric signal (SA1-SA3, SB1-SB3) representative of a magnetic field generated by the magnetic ring, wherein the sensors are arranged in at least two groups (A, B), each group of sensors being configured to generate, on the basis of the unitary signals of its sensors, at least one combined electric signal (SA, SB) representative of the angular position of the magnetic ring and wherein the system includes:
comparator means to verify, for each group of sensors, the consistency of its combined electric signal with respect to at least one rule;
computation means to determine an angular position value ($\theta_c$) of the rotary ring on the basis of the combined electric signal of a group of sensors; and
filtering means to provide the computation means with the combined electric signal of at least one group of sensors whose combined electric signal is found by the comparator means to be consistent with the rule and not to provide the computation means with the combined electric signal of any group of sensors whose combined electric signal is found by the comparator means not to be consistent with the rule.

* * * * *